US012736909B2

(12) United States Patent
Moro

(10) Patent No.: US 12,736,909 B2
(45) Date of Patent: Sep. 15, 2026

(54) IMAGE FORMING APPARATUS WITH A REFLECTOR DISPOSED ON A CLEANING BLADE SUPPORT

(71) Applicant: Masanori Moro, Kanagawa (JP)

(72) Inventor: Masanori Moro, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/939,507

(22) Filed: Nov. 6, 2024

(65) Prior Publication Data

US 2025/0164919 A1 May 22, 2025

(30) Foreign Application Priority Data

Nov. 17, 2023 (JP) ................................ 2023-196137
Jul. 10, 2024 (JP) ................................ 2024-111128

(51) Int. Cl.

*G03G 21/06* (2006.01)
*G03G 15/04* (2006.01)
*G03G 21/00* (2006.01)
*G03G 21/16* (2006.01)
*G03G 21/18* (2006.01)

(52) U.S. Cl.

CPC ....... *G03G 21/06* (2013.01); *G03G 15/04036* (2013.01); *G03G 15/04045* (2013.01); *G03G 21/0011* (2013.01); *G03G 21/0017* (2013.01); *G03G 21/0029* (2013.01); *G03G 21/007* (2013.01); *G03G 21/169* (2013.01); *G03G 21/1803* (2013.01); *G03G 21/1814* (2013.01)

(58) Field of Classification Search

CPC ....... G03G 15/04036; G03G 15/04045; G03G 21/0011; G03G 21/0017; G03G 21/0029; G03G 21/007; G03G 21/06; G03G 21/169; G03G 21/1803; G03G 21/1814
See application file for complete search history.

(56) References Cited

U.S. PATENT DOCUMENTS

2001/0024580 A1* 9/2001 Kusunose .............. G03G 21/08 399/128
2012/0237277 A1* 9/2012 Kim .................. G03G 21/0029 399/350
2015/0234341 A1 8/2015 Teraji et al.

FOREIGN PATENT DOCUMENTS

JP H05-341626 A 12/1993
JP H07-064426 A 3/1995
JP H07-181861 A 7/1995
JP 2006-049857 A 2/2006

* cited by examiner

*Primary Examiner* — Joseph S Wong
(74) *Attorney, Agent, or Firm* — XSENSUS LLP

(57) ABSTRACT

An image forming apparatus for forming an image on a recording medium includes a photoconductor, a charger, a light source, and a reflector. The charger charges a surface of the photoconductor. The light source emits charge eliminating light that discharges the surface of the photoconductor. The reflector reflects the charge eliminating light to apply reflected light to the surface of the photoconductor.

20 Claims, 11 Drawing Sheets

IMAGE FORMING APPARATUS WITH A REFLECTOR DISPOSED ON A CLEANING BLADE SUPPORT

CROSS-REFERENCE TO RELATED APPLICATIONS

This patent application is based on and claims priority pursuant to 35 U.S.C. § 119(a) to Japanese Patent Application Nos. 2023-196137, filed on Nov. 17, 2023, and 2024-111128, filed on Jul. 10, 2024 in the Japan Patent Office, the entire disclosure of which is hereby incorporated by reference herein.

BACKGROUND

Technical Field

Embodiments of the present disclosure relate to an image forming apparatus.

Related Art

In an electrophotographic image forming apparatus, a technology is known that after developer is transferred onto a photoconductor to form an image, the developer remaining on the photoconductor is removed by a cleaning blade. Also a technology is known that the surface of the photoconductor is discharged after the developer is removed by the cleaning blade.

SUMMARY

In an embodiment of the present disclosure, an image forming apparatus for forming an image on a recording medium includes a photoconductor, a charger, a light source, and a reflector. The charger charges a surface of the photoconductor. The light source emits charge eliminating light that discharges the surface of the photoconductor. The reflector reflects the charge eliminating light to apply reflected light to the surface of the photoconductor.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
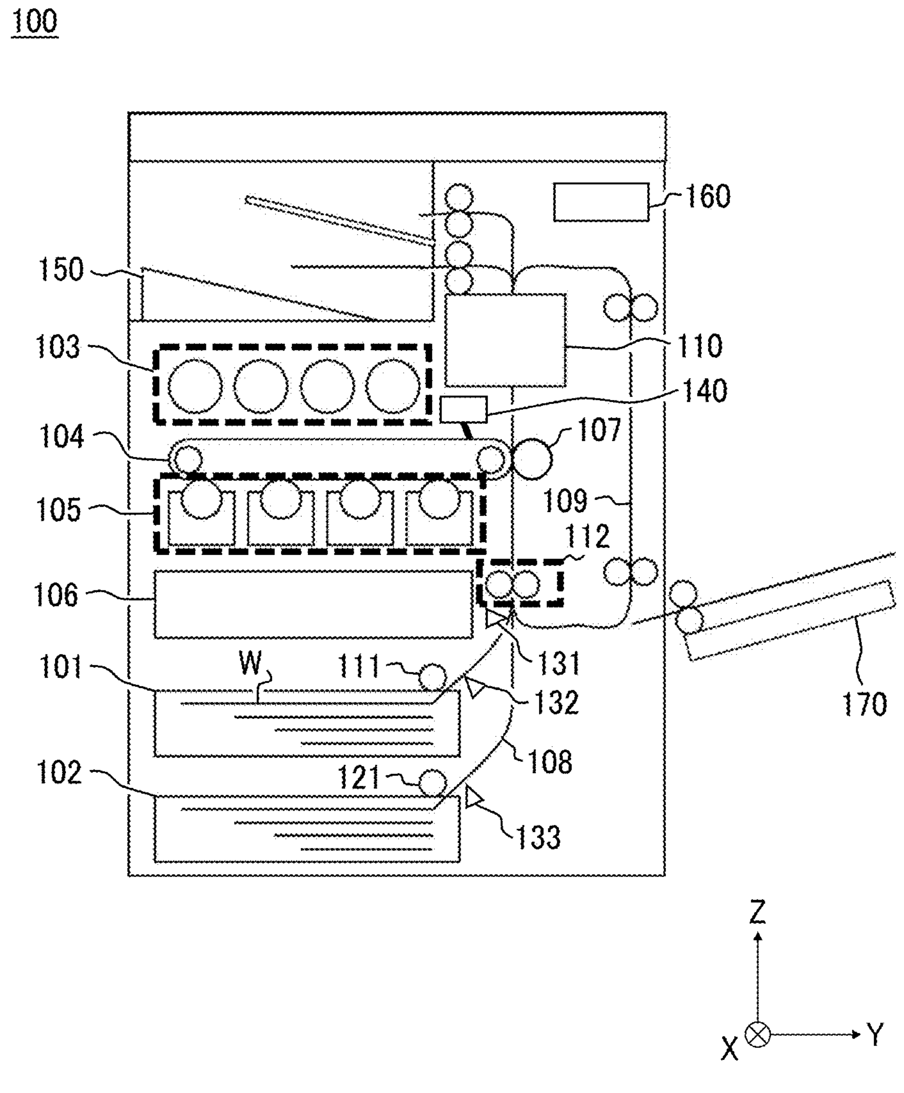
FIG. 1 is a schematic view of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. The embodiments are not limited to the specific examples described below. As used herein, the singular forms "a," "an," and "the" are intended to include the plural forms as well, unless the context clearly indicates otherwise.

First Embodiment

For example, the image forming apparatus is a multifunction peripheral (MFP) described below. In the following example, a sheet W is used as a recording medium. Hereinafter, a gravity direction is referred to as a "Z-axis direction." Directions orthogonal to the Z-axis direction are referred to as an "X-axis direction" and a "Y-axis direction."

FIG. 1 is a schematic view of an image forming apparatus 100 according to an embodiment of the present disclosure. The image forming apparatus 100 described below forms a color image on a sheet W based on input image data. Specifically, toners corresponding to four colors are provided such that a color image is formed on the surface of the sheet W using the toners of four colors. In a case of forming only a monochrome image, the image forming apparatus 100 may include toner of a single color.

The image forming apparatus 100 includes a sheet feeding device that stores a plurality of sheets W (also referred to as a "sheet bundle") and feeds the sheets W. For example, a first sheet feeding roller 111 feeds the sheets W stored in a first sheet tray 101 or a second sheet feeding roller 121 feeds the sheets W stored in a second sheet tray 102. As described above, a sheet feeding device included in the image forming apparatus 100 preferably has a configuration including a plurality of sheet trays. Hereinafter, a description is given of an example in which two sheet trays, that is, the first sheet tray 101 and the second sheet tray 102 are disposed. The number of the sheet trays may be three or more, or the number of the sheet trays may be one.

A user stores the sheets W in the first sheet tray 101 and the second sheet tray 102 in advance. In a state where the sheets W are stored, the first sheet tray 101 and the second sheet tray 102 are set as start points of the conveyance of the sheets W.

The start point of the conveyance of the sheets W may be set other than the first sheet tray 101 and the second sheet tray 102, and a manual sheet tray 170 may be set as a start point of conveyance. In the following description, a path through which the sheets W are conveyed is referred to as a "conveyance path 108." However, the conveyance path 108 differs depending on a start point of conveyance.

In the following description, the conveyance path 108 is an example of paths from the first sheet tray 101 and the second sheet tray 102 as start points. In the setting for performing printing on both sides of the sheet W, image formation is performed on the back side after the front side. In such a setting, the sheet W is conveyed through, for example, a duplex-printing conveyance path 109.

The first sheet feeding roller 111 and the second sheet feeding roller 121 convey the sheets W. The first sheet feeding roller 111 rotates to convey the sheets W one by one from the first sheet tray 101. The second sheet feeding roller 121 rotates to convey the sheets W one by one from the second sheet tray 102. The image forming apparatus 100 may use an actuator and a mechanism component other than the first sheet feeding roller 111 and the second sheet feeding roller 121 for conveyance.

In addition, it is desirable that the first sheet feeding roller 111 and the second sheet feeding roller 121 perform a process of separating one of a plurality of sheets W stored in the first sheet tray 101 and the second sheet tray 102, respectively, in the conveyance of the sheets W. In other words, it is desirable that the first sheet feeding roller 111 and the second sheet feeding roller 121 are devices that feed the sheets W while separating the sheets W one by one from the sheet bundle such that the plurality of sheets W are not conveyed together.

The image forming apparatus 100 includes a device that performs image formation on the sheet W. Specifically, the image forming apparatus 100 includes a toner bottle 103, a transfer unit 104, an image forming unit 105, a writing device 106, and a secondary transfer roller 107. These devices have different configurations depending on, for example, the number of colors.

The toner bottle 103 is a device that supplies toner of each color. Accordingly, the toner bottle 103 may be replaceable depending on the color of an image to be formed.

The transfer unit 104, the image forming unit 105, the writing device 106, and the secondary transfer roller 107 are devices that form an image with toner and transfer the image onto the sheet W. Specifically, a toner image is formed on the transfer unit 104 based on the input image data. The toner image is transferred by the secondary transfer roller 107 such that the toner image timely meets the sheet W conveyed in the conveyance path 108.

The transfer unit 104 includes a transfer roller 41 and an intermediate transfer belt 42.

The image forming unit 105 includes a photoconductor and a developing device.

Hereinafter, it is assumed that the sheet W is first conveyed to a registration roller pair 112 with the first sheet tray 101 being set as a "conveyance start position." When a plurality of sheet trays are disposed, the conveyance start position may differ depending on the setting of which sheet tray is used to convey a sheet W.

In addition, the image forming apparatus 100 includes a fixing unit 110. Specifically, the fixing unit 110 performs a fixing process. The image forming apparatus 100 may include an apparatus that performs pre-processing or post-processing.

The image forming apparatus 100 includes a sensor that detects the sheet W. For example, the image forming apparatus 100 includes a first sensor 131, a second sensor 132, and a third sensor 133. Specifically, the first sensor 131, the second sensor 132, and the third sensor 133 are optical sensors. Any type of sensor can be used as long as it can detect the sheet W. Sensors are disposed at positions where detection is performed. Accordingly, the sensors may be disposed in positions other than the positions illustrated in FIG. 1. The image forming apparatus 100 may include any number of sensors.

The conveyance time required for conveying the sheet W in a specified section can be measured by the detection by each sensor. For example, it is assumed that the specified section is a section from the conveyance start position to the position of the registration roller pair 112, the conveyance time is acquired by measuring the time from the time point when the conveyance of the sheet W is started by the first sheet feeding roller 111 to the time point when the sheet W is detected by the first sensor 131.

The specified section is optionally set according to, for example, the start time of the process and the installation position of the sensor.

The image forming apparatus 100 includes a device that cleans the transfer unit 104. Specifically, the image forming apparatus 100 includes a cleaning device 140. The cleaning device 140 performs a process of removing an image formed on the transfer unit 104.

When the image forming apparatus 100 has completed the image formation, the image forming apparatus 100 ejects the sheet W to an output tray 150.

The image forming apparatus 100 includes a controller 160. For example, the controller 160 has a hardware configuration including an arithmetic device, a control device, a storage device, an input device, and an output device. Accordingly, the controller 160 controls the devices included in the image forming apparatus 100 and executes each process. The controller 160 may include multiple devices instead of one device.

The image forming apparatus 100 is not limited to the above-described configuration. For example, the image forming apparatus 100 may further include a pre-processing apparatus, an information processing apparatus, or a post-processing apparatus. The image forming apparatus 100 is not limited to a multifunction peripheral (MFP), and may be a copier or a printer.

Hereinafter, the light that discharges the photoconductor is referred to as "charge eliminating light."

An electrophotographic image forming apparatus performs a writing process on a charged photoconductor by optical scanning. Such a writing process is performed to form an electrostatic latent image on the photoconductor. The electrostatic latent image is developed by a developing device. Next, the toner image developed on the photoconductor by the developing device is transferred by a transfer device onto a transferor such as an intermediate transfer member. After such a transfer process, residual charge may remain on the photoconductor. The residual charge is discharged by the charge eliminating light emitted from, for example, a discharge lamp.

The reason why the photoconductor is discharged with the charge eliminating light is as follows.

The photoconductor after the transfer process has a history of the electrostatic latent image. In a state where the photoconductor has a history of the electrostatic latent image, the potential of the surface of the photoconductor is unlikely to be uniform even after a charging process is performed.

Accordingly, when a subsequent image is formed in a state where the photoconductor has a history of the electrostatic latent image, that is, the potential of the surface of the photoconductor is not uniform, an afterimage of the previous image may be generated in a solid area of the image. The photoconductor is discharged by charge eliminating light after the transfer process to remove the history of the electrostatic latent image in order to prevent the occurrence of such an afterimage. In this way, when the charge elimination of the photoconductor is performed by the charge eliminating light, image quality can be enhanced.

Figure 2:
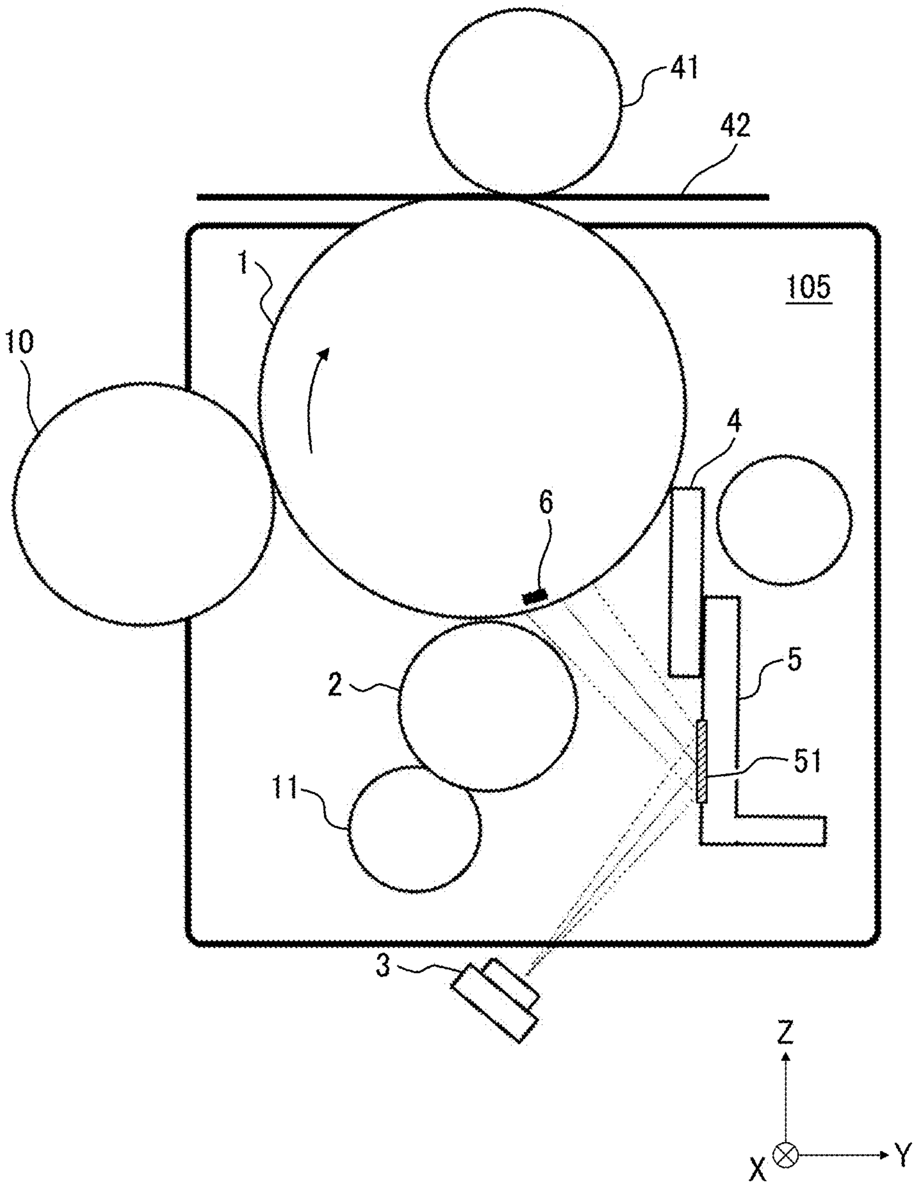
FIG. 2 is a diagram illustrating an example of a configuration of an image forming apparatus.

FIG. 2 is a view of an apparatus having a configuration similar to the configuration of the image forming unit 105 included in the image forming apparatus 100 illustrated in FIG. 1. The photoconductor 1 rotates in the direction indicated by the arrow illustrated in FIG. 2. For example, a charging roller 2, a light emitter 3, a cleaning blade 4, a supporting member 5, a developing roller 10, and a cleaning roller 11 are disposed around the photoconductor 1.

In addition, for example, the transfer roller 41 and the intermediate transfer belt 42 included in the transfer unit 104 are disposed around the photoconductor 1.

The developing roller 10 develops a toner image on the surface of the photoconductor 1. When a transfer voltage is applied to the transfer roller 41, a toner image on the photoconductor 1 is transferred onto the intermediate transfer belt 42.

Next, toner images formed on the photoconductors 1 are sequentially transferred and superimposed onto the intermediate transfer belt 42, so that a color toner image is formed on the intermediate transfer belt 42.

The cleaning roller 11 is a roller for removing foreign substances adhering to the charging roller 2.

The peripheral configuration of the photoconductor 1 is not limited to the above-described configuration, and devices may be disposed at positions other than the illustrated positions, or devices other than the above-described devices may be disposed.

The photoconductor 1 is a component on which an electrostatic latent image is formed in image formation.

The charging roller 2 is an example of a charger. Accordingly, the charging roller 2 performs a charging process of charging the photoconductor 1 to form an electrostatic latent image on the surface of the photoconductor 1. The charger is often disposed near the photoconductor 1 to charge the surface of the photoconductor 1. The charger is not limited to the charging roller 2 that contacts the photoconductor 1 and may be a charger that charges the surface of the photoconductor 1 without contacting the photoconductor 1.

The light emitter 3 (also serving as a charge-eliminating-light source) is an example of a light source that emits charge eliminating light. For example, the position at which the light emitter 3 is disposed and the angle at which the charge eliminating light is emitted are adjusted depending on the positional relation with a reflector 51.

The surface of the photoconductor 1 is irradiated with the charge eliminating light from the light emitter 3 so that the surface potential of the photoconductor 1 is discharged before the surface of the photoconductor 1 is charged by the charging roller 2.

The light emitter 3 is, for example, a light emitting diode (LED). The light emitter 3 has an emitting surface extending in the width direction to correspond to the range of the photoconductor 1 in the width direction (the direction perpendicular to the plane on which FIG. 2 is illustrated).

The cleaning blade 4 performs a cleaning process of cleaning the surface of the photoconductor 1. The supporting member 5 is a mechanism that supports the cleaning blade 4. The cleaning blade 4 and the supporting member 5 may be united or may have a configuration of combining a plurality of components.

The supporting member 5 is fixed (assembled) to the frame of the image forming unit 105 with a fastening member such as a screw.

The supporting member 5 includes a portion (hereinafter referred to as the "reflector 51") that reflects the charge eliminating light. A description is given of the reflector 51 in detail later.

In the example illustrated in FIG. 2, the supporting member 5 functions as a reflector. For example, the position at which the charge eliminating light is to be applied is set as an "irradiation position 6."

The irradiation position 6 is a position downstream from the cleaning blade 4 in the rotation direction of the photoconductor 1 and is a position upstream from the charging roller 2 in the rotation direction of the photoconductor 1.

The reflector 51 is the cleaning blade 4 or the supporting member 5. The reflector 51 may be a part or the whole of the cleaning blade 4 or the supporting member 5. Hereinafter, a description is given of an example in which the reflector 51 is the supporting member 5.

The light emitter 3 emits the charge eliminating light toward the reflector 51. When the charge eliminating light hits the reflector 51, the charge eliminating light is reflected and becomes "reflected light" (hereinafter, the charge eliminating light after being reflected by the reflector 51 is simply referred to as "reflected light"). The reflected light is reflected by the reflector 51 and hits the irradiation position 6 on the surface of the photoconductor 1.

For example, the incident angle at which light of the light emitter 3 hits the reflector 51, the reflection angle by the reflector 51, and the position of the reflector 51 are set in advance so that the reflected light hits the irradiation position 6. Similarly, the range of the reflected light is also set in advance.

An optical component such as a lens or a filter may be disposed on the paths of the charge eliminating light and the reflected light.

The reflector 51 is formed by a manufacturing method such as metal deposition, mirror reflection processing, or plating processing.

The metal is, for example, gold, silver, or aluminum. When such a kind of metal is vapor-deposited, sufficient reflectance can be obtained.

Similarly, the reflector 51 may be formed by plating gold, silver, or aluminum. When such a kind of metal is deposited by plating, sufficient reflectance can be obtained.

The reflector 51 may be processed by mirror polishing to have a higher reflectance. Alternatively, the reflector 51 may be coated with a coating material having a higher reflectance. Accordingly, the reflector 51 may be a reflective coating material applied in advance on the surface of the cleaning blade 4 or the supporting member 5.

Figure 3:
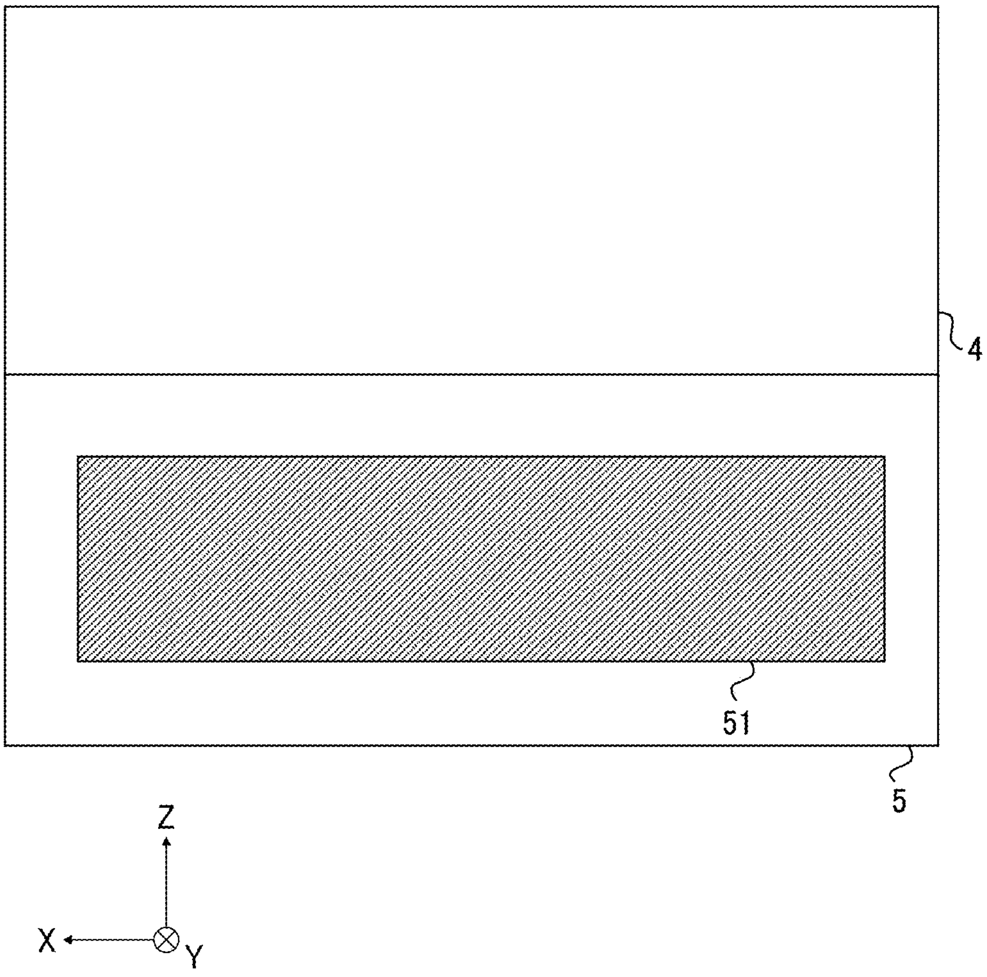
FIG. 3 is a schematic view of a reflector illustrating a first shape example.

FIG. 3 is a schematic view of a reflector illustrating a first shape example. For example, a part of the supporting member 5 is processed to be the reflector 51 so that the reflectance is uniform. Specifically, the reflector 51 is manufactured in a rectangular shape with the X-axis direction as the longitudinal direction.

The length of the reflector 51 in the longitudinal direction corresponds to the length of, for example, the width of the photoconductor 1 (in the direction orthogonal to the circumference). In other words, the length of the reflector 51 in the longitudinal direction is set to be equal to or longer than, for example, the width of the photoconductor 1. With such a length, the irradiation range can be set so that the reflected light is applied to the entire range of the photoconductor 1 in the width direction.

The length of the reflector 51 in the lateral direction is set, for example, according to the irradiation range of the reflected light on the surface of the photoconductor 1. Specifically, when the length of the reflector 51 in the lateral direction is set to be long, the irradiation range of the reflected light is widened in the circumferential direction of the photoconductor 1. On the other hand, when the length of the reflector 51 in the lateral direction is set to be short, the irradiation range of the reflected light is narrowed in the circumferential direction of the photoconductor 1.

The irradiation range of the reflected light is a range including at least a portion shaded by the charging roller 2, that is, a portion where the charging roller 2 overlaps the photoconductor 1 when the charging roller 2 and the photoconductor 1 are viewed from a viewpoint in a direction orthogonal to the circumferential surface of the photoconductor 1 (in the Z-axis direction from the light emitter 3 in FIG. 2).

The length, ratio, and area of the reflector 51 in each direction vary depending on the range to which the reflected light is applied, the intensity of the reflected light, and the incident angle.

Figure 4:
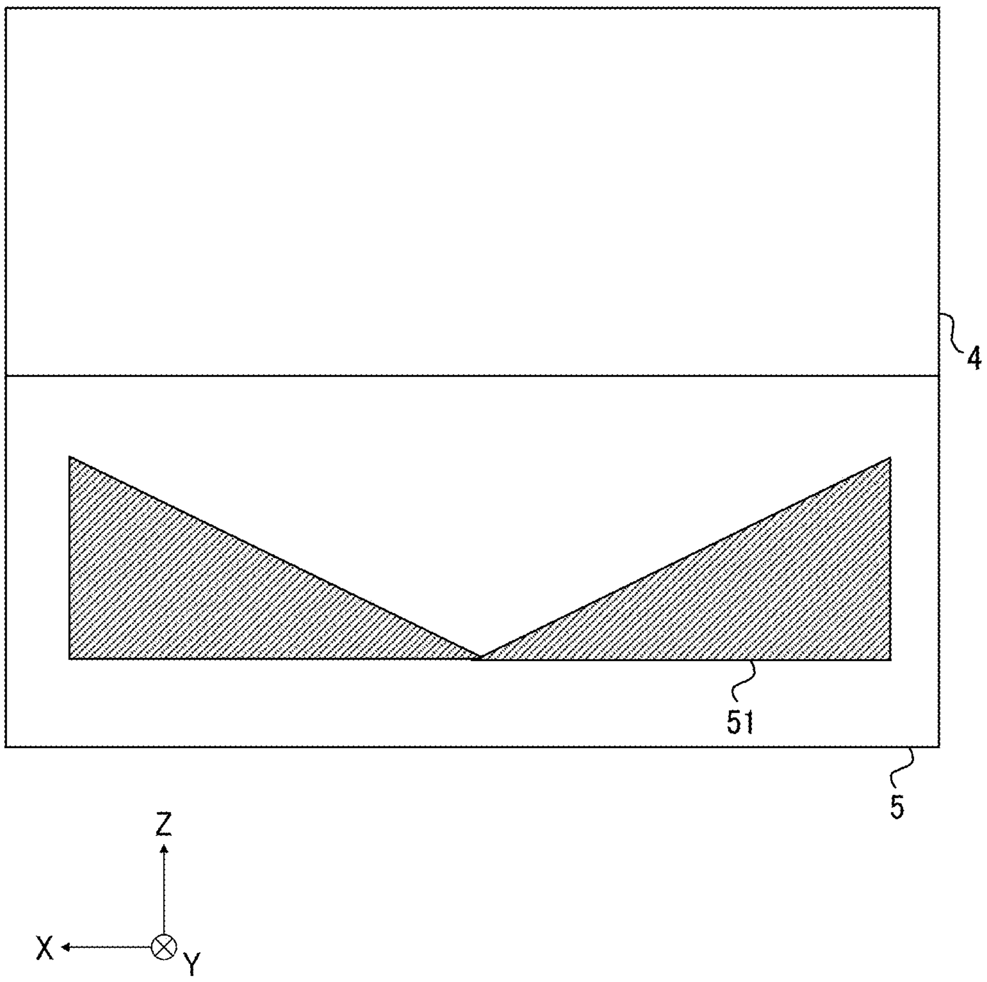
FIG. 4 is a schematic view of a reflector illustrating a second shape example.

FIG. 4 is a schematic view of a reflector illustrating a second shape example. For example, the reflector 51 has a shape in which the center portion in the longitudinal direction is thinner in the Z-axis direction than the first shape example.

In the second shape example, the center portion of the reflector 51 in the longitudinal direction is an unprocessed portion and does not reflect much charge eliminating light. On the other hand, the ends of the reflector 51 in the longitudinal direction are processed portions. Accordingly, the ends of the reflector 51 in the longitudinal direction have a large reflecting portion, and the center portion of the reflector 51 in the longitudinal direction has a small reflecting portion.

In this way, when the reflector 51 has a tapered shape that becomes thinner toward the center portion, the irradiation of the reflected light can be biased so that the reflected light is well irradiated to the ends of the photoconductor 1 in the width direction and the reflected light is not much irradiated to the center portion of the photoconductor 1 in the width direction.

Before the charge elimination, the charge distribution on the photoconductor 1 may be biased due to discharge by a charger, the flow of the charge into the photoconductor 1 by a transferor, or the occurrence of a bias in the film thickness of the photoconductor 1 in the longitudinal direction. Accordingly, before the charge elimination, when the charge amount having the same polarity as the charged polarity is small in the center portion, the reflection of the charge eliminating light applied to the center portion is reduced. Such a configuration can reduce the deviation of the charge distribution in the longitudinal direction after the charge elimination.

When the intensity distribution of the charge eliminating light is biased, the reflection of the charge eliminating light to a portion where the intensity is high is reduced, and the reflection of the charge eliminating light to a portion where the intensity is low is increased. Such a configuration can reduce the deviation of the reflected light with which the photoconductor 1 is irradiated in the longitudinal direction.

The shape of the reflector 51 is not limited to the tapered shape illustrated in FIG. 4 as long as the reflecting area of the center portion in the longitudinal direction (in the X-axis direction in FIG. 4) of the reflector 51 is relatively smaller than the reflecting area of the ends in the longitudinal direction. For example, the reflector 51 may have a shape in which a rectangular region having a small reflection area is at the center portion and a rectangular region having a large reflection area is at each of the ends.

Figure 5:
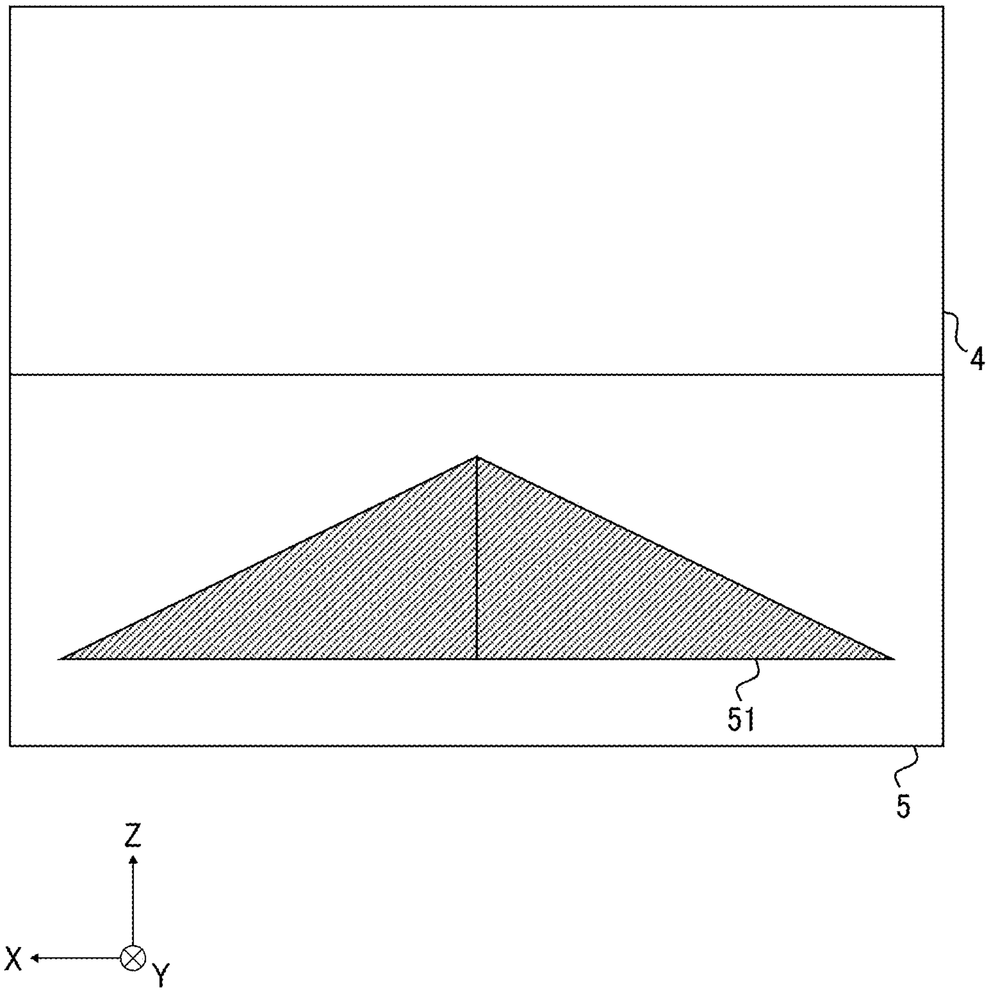
FIG. 5 is a schematic view of a reflector illustrating a third shape example.

FIG. 5 is a schematic view of a reflector illustrating a third shape example. For example, the reflector 51 has a shape in which the center portion in the longitudinal direction is thicker in the Z-axis direction and the ends in the longitudinal direction are thinner in the Z-axis direction than the first shape example.

In the third shape example, the ends of the reflector 51 in the longitudinal direction are unprocessed portions, and thus do not reflect much charge eliminating light. On the other hand, the center portion of the reflector 51 in the longitudinal direction is a processed portion. Accordingly, the center portion of the reflector 51 in the longitudinal direction has a large reflecting portion, and the ends of the reflector 51 in the longitudinal direction have a small reflecting portion.

In this way, when the reflector 51 has a tapered shape that becomes thicker toward the center portion, the irradiation of the reflected light can be biased so that the reflected light is well irradiated to the center portion of the photoconductor 1 in the width direction and the reflected light is not much irradiated to the ends of the photoconductor 1 in the width direction.

Figure 6:
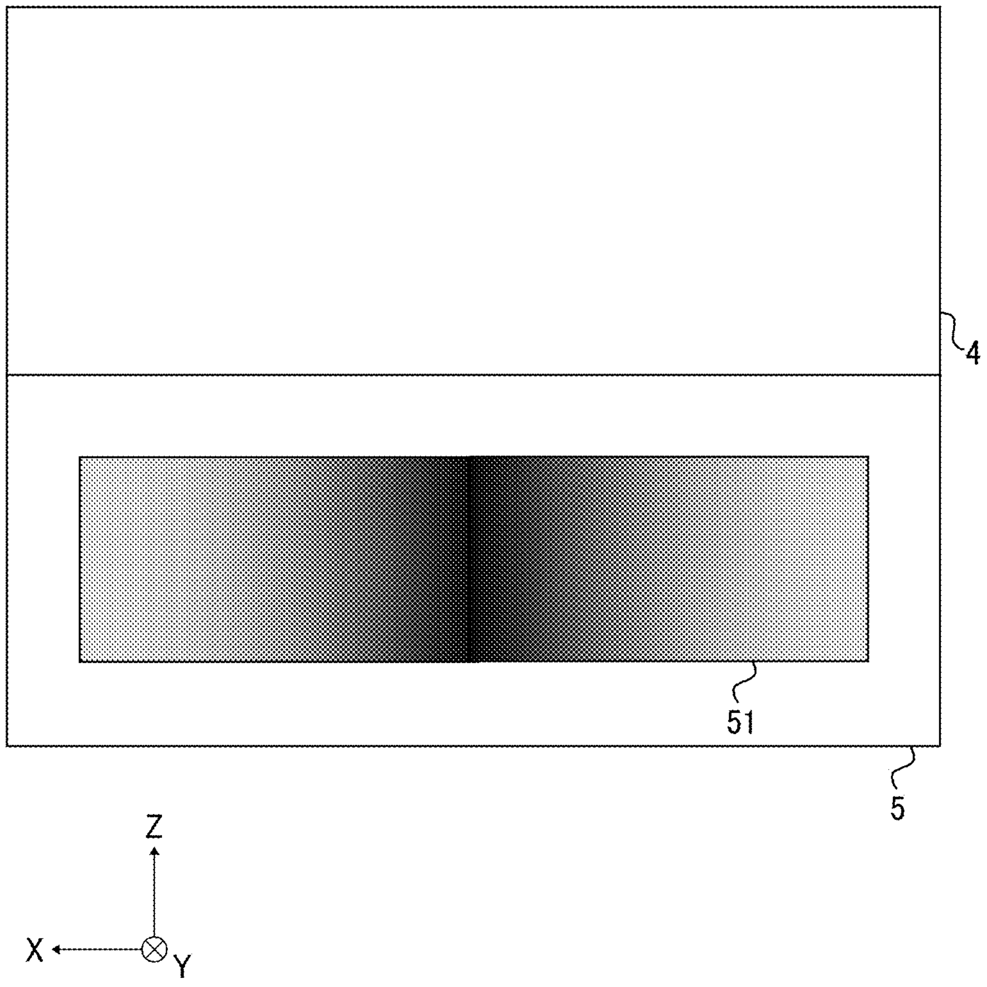
FIG. 6 is a schematic view of a reflector illustrating a fourth shape example.

FIG. 6 is a schematic view of a reflector illustrating a fourth shape example. For example, the reflector 51 is different from the first shape example in that the reflectance varies depending on the portion in the longitudinal direction.

In the fourth shape example, the center portion of the reflector 51 in the longitudinal direction has a high reflectance. On the other hand, the ends of the reflector 51 in the longitudinal direction have a low reflectance.

In this way, when the reflectance of the reflector 51 increases toward the center portion, the irradiation of the reflected light can be biased so that the reflected light is well irradiated to the center portion of the photoconductor 1 in the width direction and the reflected light is not much irradiated to the ends of the photoconductor 1 in the width direction.

In the above-described fourth shape example, the portion of the reflector 51 having a high reflectance preferably has a reflectance of 70% or more. When the reflectance of the reflector 51 is 70% or more, the surface of the photoconductor 1 can be sufficiently discharged by the charge eliminating light, and thus the occurrence of afterimages or uneven images can be reduced.

Comparative Example

Figure 7:
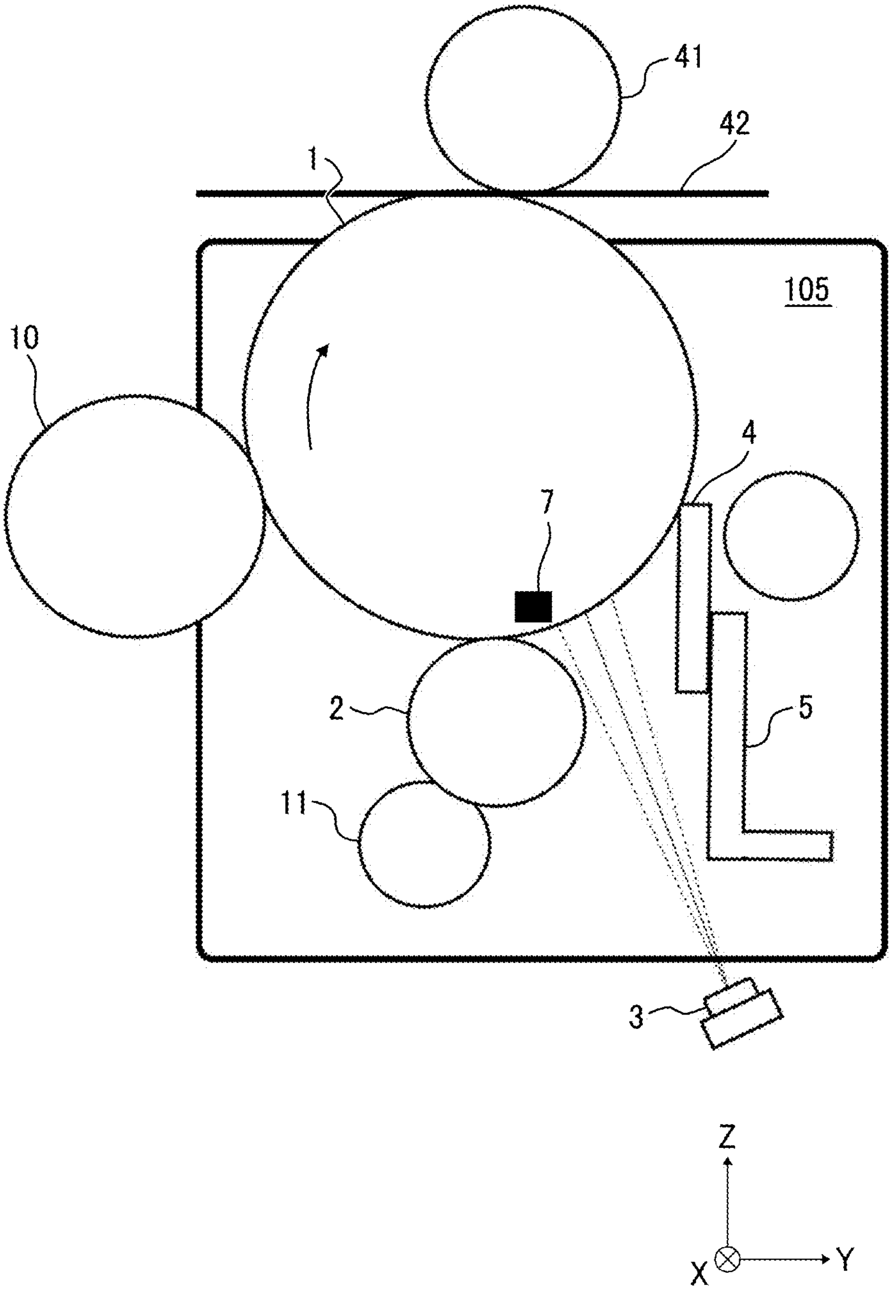
FIG. 7 is a diagram illustrating a configuration of an image forming apparatus according to a comparative example.

FIG. 7 is a diagram illustrating a configuration of an image forming apparatus according to a comparative example. The comparative example is different from the example illustrated in FIG. 2 in that the reflector 51 is not disposed.

In the configuration in which the reflector 51 is not disposed, when a component such as the charging roller 2 is disposed, a blind portion (hereinafter, referred to as a "non-irradiation portion 7"), which is shaded by the charging roller 2 and is not irradiated with the charge eliminating light, may occur, for example, depending on the positional relation of the photoconductor 1, the charging roller 2, and the light emitter 3.

In particular, when the width of the photoconductor 1 is narrowed for downsizing, the number of paths through which the charge eliminating light passes is often lessened. When the non-irradiation portion 7 increases, sufficient charge elimination may not be performed.

In the configuration of the present embodiment, even if there is a portion shaded by the charging roller 2 on the photoconductor 1 as described above in the comparative example, in other words, a portion in which the charging roller 2 overlaps the photoconductor 1 when the charging roller 2 and the photoconductor 1 are viewed from a viewpoint in a direction orthogonal to the circumferential surface of the photoconductor 1, the shaded portion (in other words, the overlapping portion) can be irradiated with the charge eliminating light by the reflector 51. Such a configuration can reduce a blind spot when the surface of the photoconductor 1 is irradiated with the charge eliminating light.

Second Embodiment

Figure 8:
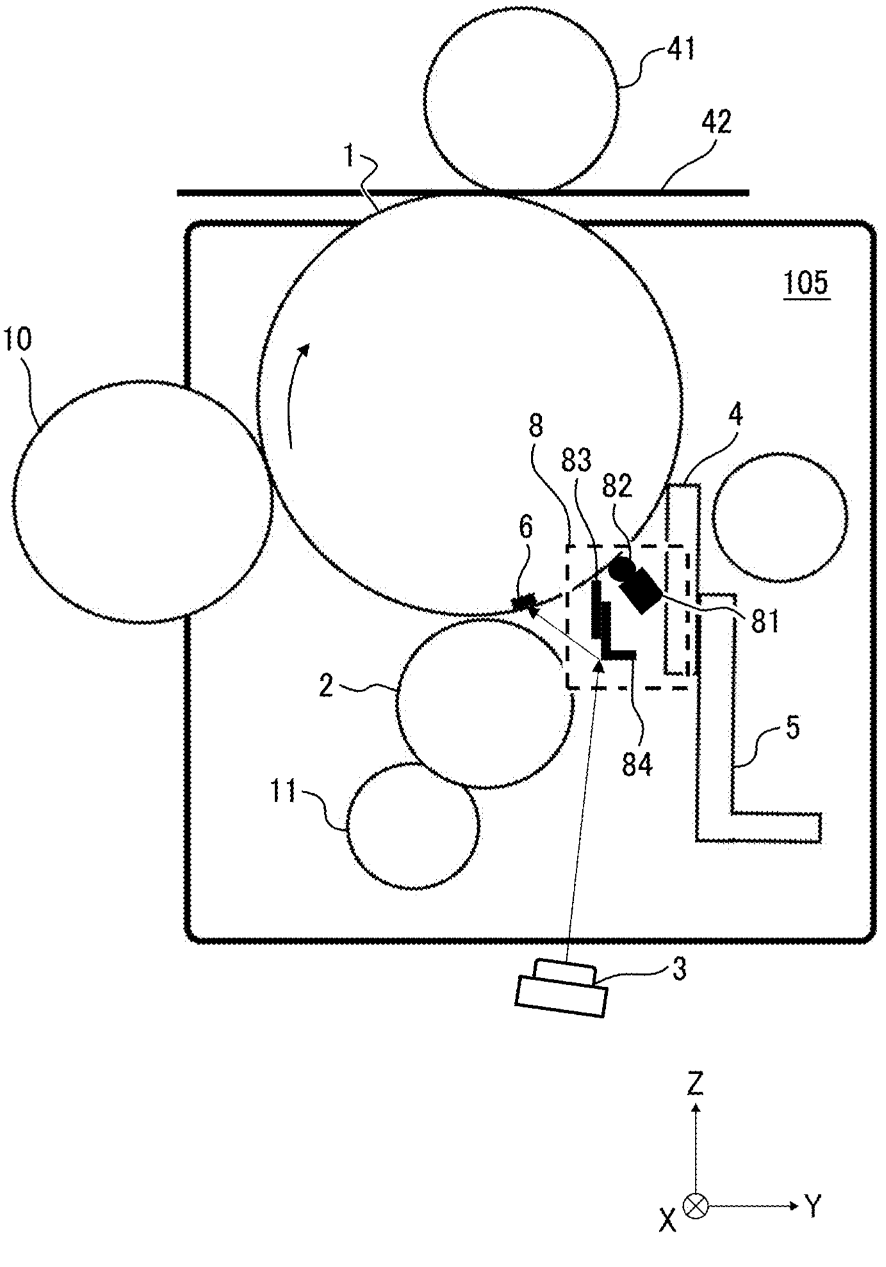
FIG. 8 is a diagram illustrating a configuration of an image forming apparatus according to a second embodiment of the present disclosure.

FIG. 8 is a view of an image forming apparatus 100 according to the second embodiment. The second embodiment is different from the first embodiment in that the image forming apparatus 100 further includes a lubricant application unit 8.

The lubricant application unit 8 includes an application brush roller 82, a lubricant leveling blade 83, and a blade holder 84. The application brush roller 82 scrapes off a lubricant 81 from a solid lubricant made of, for example, zinc stearate and applies the scraped powder lubricant 81 to the surface of the photoconductor 1. The lubricant leveling blade 83 is disposed downstream from the application brush roller 82 in the rotation direction of the photoconductor 1, and presses and spreads the lubricant 81 on the photoconductor 1. The blade holder 84 supports the lubricant leveling blade 83.

For example, the reflector 51 is disposed on the blade holder 84. The reflector 51 reflects the charge eliminating light irradiated from the light emitter 3 and can irradiate the surface of the photoconductor 1 that overlaps the charging roller 2 with the charge eliminating light.

The lubricant application unit 8 is often disposed near the photoconductor 1 because the lubricant application unit 8 applies the lubricant by contacting the surface of the photoconductor 1. Accordingly, when the lubricant application unit 8 includes the reflector 51, the shaded area can be reduced, and the blind area can be reduced when the surface of the photoconductor 1 is discharged by the charge eliminating light.

Figure 9:
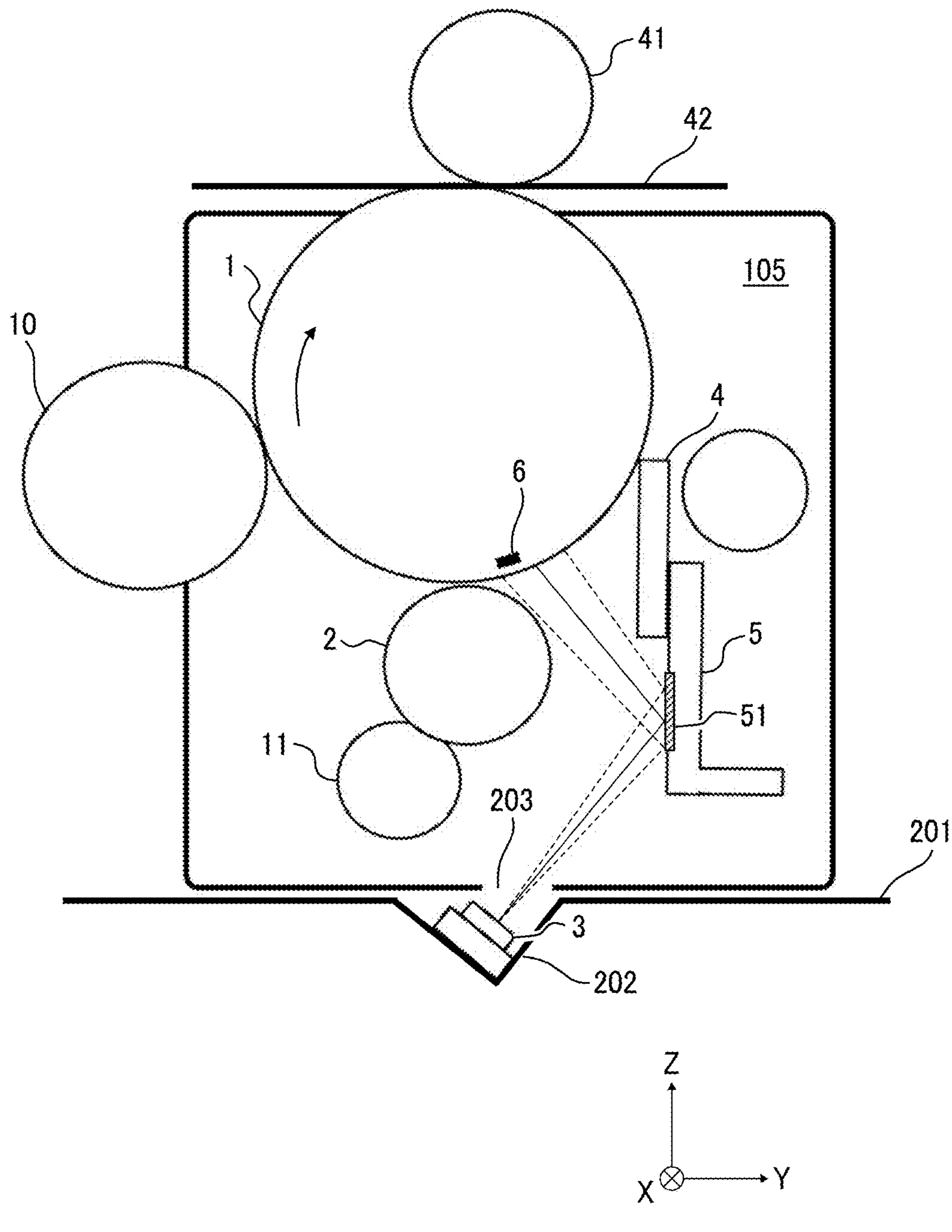
FIG. 9 is a schematic view of a light emitter illustrating a first attachment example.

FIG. 9 is a diagram illustrating a first example of attachment of the light emitter 3. FIG. 9 differs from FIG. 2 in the attachment of the light emitter 3. A description is given of different points below, and a redundant description may be omitted.

In the example illustrated in FIG. 9, the light emitter 3 is attached to a body rail 201. Specifically, the body rail 201 has a recess 202. For example, the recess 202 is formed by performing processing such as bending to the body rail 201. The recess 202 is formed in accordance with the size of the light emitter 3 and the angle of the light emitter 3 with respect to the supporting member 5. Specifically, the recess 202 is formed toward the outside of the body rail 201.

The body rail 201 is a holding member that holds the image forming unit 105.

In addition, in order to maintain the path of light from the light emitter 3 to the reflector 51, a slit 203 is formed in the image forming unit 105. The position, size, shape, and range of the slit 203 are set according to, for example, the positional relation of the light emitter 3 and the reflector 51, the angle at which the light emitter 3 is disposed, and the irradiation range of the charge eliminating light emitted by the light emitter 3.

Figure 10:
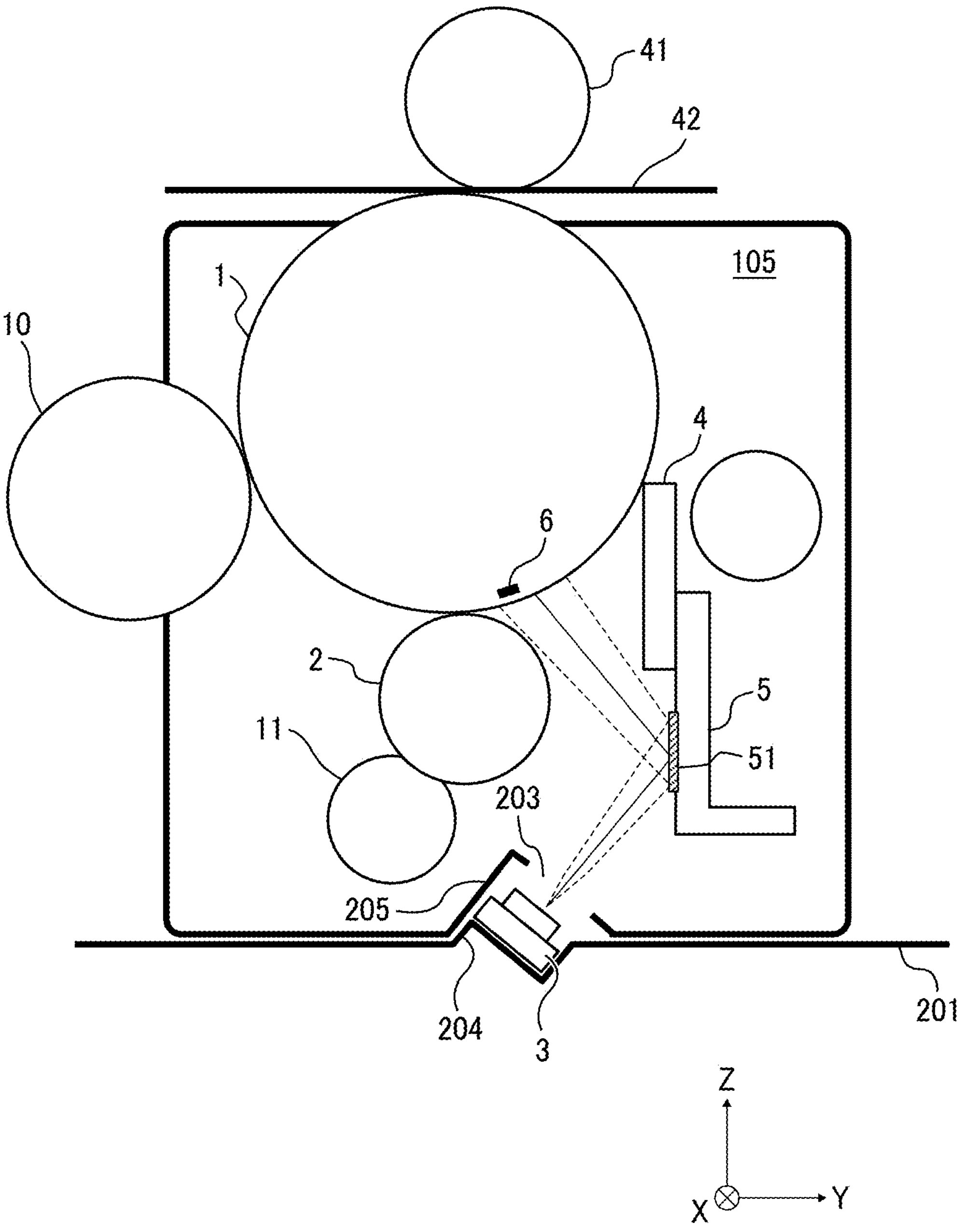
FIG. 10 is a schematic view of a light emitter illustrating a second attachment example.

FIG. 10 is a diagram illustrating a second example of attachment of the light emitter 3. FIG. 10 is different from FIG. 9 in that the attachment position of the light emitter 3 is inside the image forming unit 105. In accordance with the attachment position, the shapes of the body rail 201 and the image forming unit 105 in FIG. 10 are also different from those in FIG. 9.

In the example illustrated in FIG. 10, a first recess 204 is formed shallower than the recess 202 of FIG. 9 toward the outside of the imaging forming unit 105. On the other hand, a second recess 205 is formed in the image forming unit 105 toward the inside of the image forming unit 105.

The size, angle, and ratio of the first recess 204 and the second recess 205 vary depending on the positional relation of the light emitter 3 and the reflector 51, the angle at which the light emitter 3 is disposed, the irradiation range of the charge eliminating light emitted by the light emitter 3.

Figure 11:
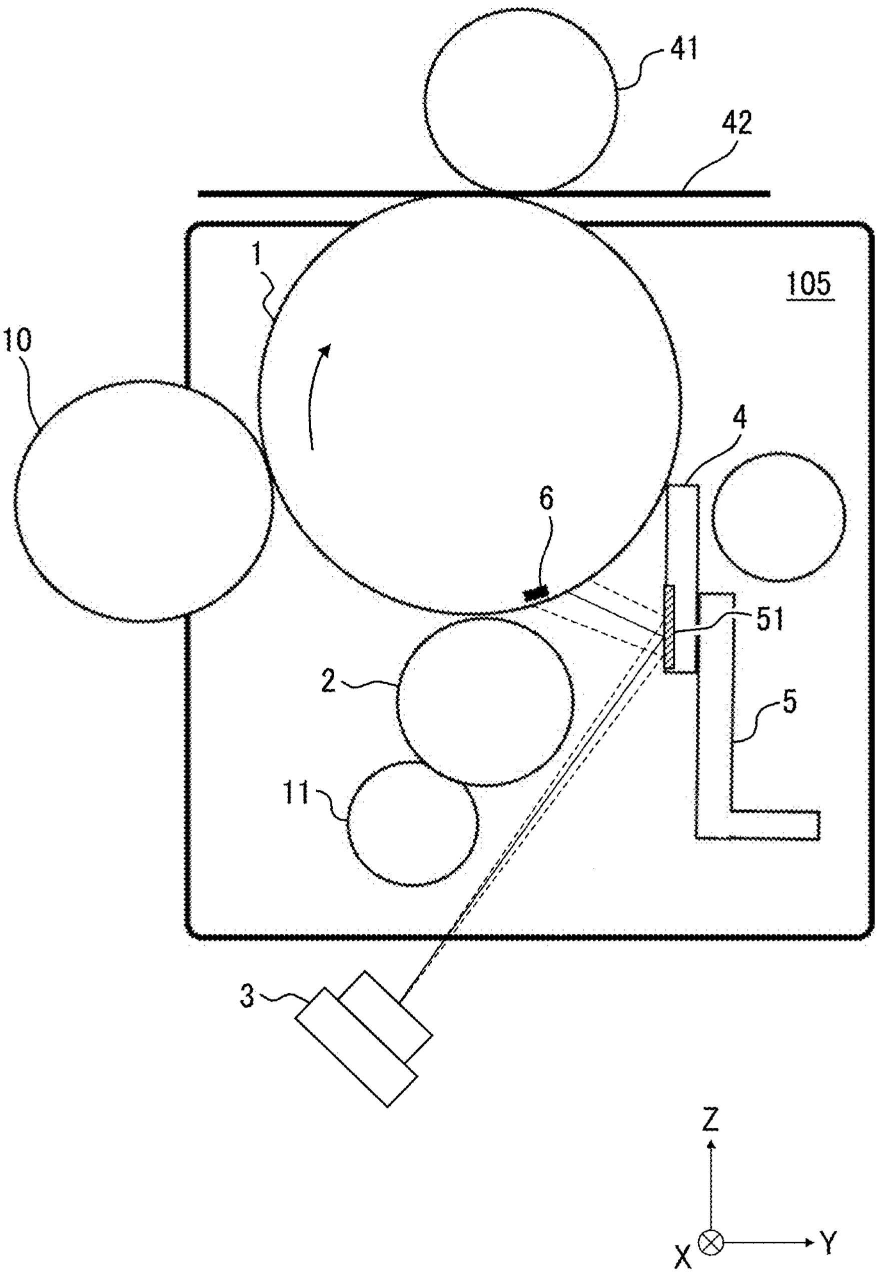
FIG. 11 is a schematic view of a reflector illustrating an example attaching to a cleaning blade.

FIG. 11 is a diagram illustrating an example of attaching the reflector 51 to the cleaning blade 4. For example, as illustrated in FIG. 11, the reflector 51 may be attached to the cleaning blade 4.

Other Embodiments

The arrangement of the reflector 51 is not limited to the example in which the reflector 51 is disposed on the supporting member 5 of the blade 4, and may be disposed on another component. For example, the reflector 51 may be disposed on the frame of the image forming unit 105.

A description is given below of some aspects of the present disclosure.

First Aspect

An image forming apparatus (e.g., the image forming apparatus 100) that forms an image on a recording medium (e.g., the sheet W) includes a photoconductor (e.g., the photoconductor 1), a charger (e.g., the charging roller 2), a light source (e.g., the light emitter 3), and a reflector (e.g., the reflector 51). The charger charges a surface of the photoconductor. The light source emits charge eliminating light that discharges the surface of the photoconductor. The reflector reflects the charge eliminating light to apply reflected light to the surface of the photoconductor.

Second Aspect

In the image forming apparatus (e.g., the image forming apparatus 100) according to the first aspect, the reflector (e.g., the reflector 51) has a metal portion.

Third Aspect

In the image forming apparatus (e.g., the image forming apparatus 100) according to the first aspect, the reflector (e.g., the reflector 51) includes a mirror reflector.

Fourth Aspect

In the image forming apparatus (e.g., the image forming apparatus 100) according to the first aspect, the reflector (e.g., the reflector 51) has a plated portion.

Fifth Aspect

In the image forming apparatus (e.g., the image forming apparatus 100) according to the first aspect, the reflector (e.g., the reflector 51) is a reflective coating applied to a cleaning blade (e.g., the cleaning blade 4) that cleans the photoconductor (e.g., the photoconductor 1) or applied to a supporting member (e.g., the supporting member 5) that supports the cleaning blade.

Sixth Aspect

In the image forming apparatus (e.g., the image forming apparatus 100) according to the first aspect, the reflector (e.g., the reflector 51) is a cleaning blade (e.g., the cleaning blade 4) that cleans the photoconductor (e.g., the photoconductor 1) or a supporting member (e.g., the supporting member 5) that supports the cleaning blade.

Seventh Aspect

In the image forming apparatus (e.g., the image forming apparatus 100) according to the first aspect, the reflector (e.g., the reflector 51) is a lubricant application unit (e.g., the lubricant application unit 8) that applies a lubricant to the photoconductor (e.g., the photoconductor 1).

Eighth Aspect

In the image forming apparatus (e.g., the image forming apparatus 100) according to any one of the first to seventh aspects, the reflector (e.g., the reflector 51) has a reflectance of 70% or more.

Ninth Aspect

In the image forming apparatus (e.g., the image forming apparatus 100) according to any one of the first to eighth aspects, the reflector (e.g., the reflector 51) has a reflectance that varies depending on a portion of the reflector.

Tenth Aspect

In the image forming apparatus (e.g., the image forming apparatus 100) according to any one of the first to eighth aspects, the charge eliminating light reflected by the reflector (e.g., the reflector 51) hits a portion of the surface of the photoconductor (e.g., the photoconductor 1) that the charger (e.g., the charging roller 2) overlaps when viewed from a direction orthogonal to a circumferential surface of the photoconductor.

Note that the present disclosure is not limited to the above-described embodiments. Addition of components or modification is possible without departing from the technical gist of the present disclosure. All of the technical matters included in the technical idea described in the claims are objects of the present disclosure. Note that the above-described embodiments are preferable specific examples to be implemented. It is therefore to be understood that the present disclosure may be practiced otherwise by those skilled in the art than as specifically described herein. Such modifications are also included in the technical scope of the present disclosure.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

The invention claimed is:

1. An image forming apparatus for forming an image on a recording medium, the image forming apparatus comprising:

a photoconductor;

a charger to charge a surface of the photoconductor;

a light source to emit charge eliminating light that discharges the surface of the photoconductor;

a reflector to reflect the charge eliminating light to apply reflected light to the surface of the photoconductor; and a support including an attachment surface to which a cleaning blade is attached, wherein the reflector is disposed on the attachment surface of the support.

2. The image forming apparatus according to claim 1, wherein the reflector has a metal portion.

3. The image forming apparatus according to claim 1, wherein the reflector includes a mirror reflector.

4. The image forming apparatus according to claim 1, wherein the reflector has a plated portion.

5. The image forming apparatus according to claim 1, wherein the reflector is a reflective coating applied to a cleaning blade that cleans the photoconductor or applied to a supporting member that supports the cleaning blade.

6. The image forming apparatus according to claim 1, wherein the reflector is a lubricant application unit that applies a lubricant to the photoconductor.

7. The image forming apparatus according to claim 1, wherein the reflector has a reflectance of 70% or more.

8. The image forming apparatus according to claim 1, wherein the reflector has a reflectance that varies depending on a portion of the reflector.

9. The image forming apparatus according to claim 1, wherein the charge eliminating light reflected by the reflector hits a portion of the surface of the photoconductor that the charger overlaps when viewed from a direction orthogonal to a circumferential surface of the photoconductor.

10. The image forming apparatus according to claim 1, wherein the light source is disposed directly above the charger.

11. The image forming apparatus according to claim 10, further comprising:

an intermediate transfer belt, wherein the light source emits the charge eliminating light toward a position downstream from a contact position between the photoconductor and an intermediate transfer belt in a moving direction of the intermediate transfer belt.

12. An image forming apparatus for forming an image on a recording medium, the image forming apparatus comprising:

a photoconductor;

a charger to charge a surface of the photoconductor;

a light source to emit, in a light emitting direction, charge eliminating light that discharges the surface of the photoconductor; and a reflector to reflect the charge eliminating light to apply reflected light to the surface of the photoconductor, wherein an axis extending in the light emitting direction does not intersect with the photoconductor.

13. The image forming apparatus according to claim 12, wherein the light source is disposed directly above the charger.

14. The image forming apparatus according to claim 13, further comprising:

an intermediate transfer belt, wherein the light source emits the charge eliminating light toward a position downstream from a contact position between the photoconductor and an intermediate transfer belt in a moving direction of the intermediate transfer belt.

15. The image forming apparatus according to claim 12, wherein the reflector has a metal portion.

16. The image forming apparatus according to claim 12, wherein the reflector includes a mirror reflector.

17. The image forming apparatus according to claim 12, wherein the reflector has a plated portion.

18. The image forming apparatus according to claim 12, wherein the reflector is a reflective coating applied to a cleaning blade that cleans the photoconductor or applied to a supporting member that supports the cleaning blade.

19. The image forming apparatus according to claim 12, wherein the reflector has a reflectance of 70% or more.

20. The image forming apparatus according to claim 12, wherein the reflector has a reflectance that varies depending on a portion of the reflector.

* * * * *